US012741292B2

(12) United States Patent
Fideler et al.

(10) Patent No.: US 12,741,292 B2
(45) Date of Patent: Sep. 22, 2026

(54) ROBOTIC SPRAY HEAD AND CONTROL SYSTEM

(71) Applicant: Wagner Spray Tech Corporation, Plymouth, MN (US)

(72) Inventors: Brian Lee Fideler, Jordan, MN (US); Sebastian Mangold, Salem (DE)

(73) Assignee: Wagner Spray Tech Corp, Plymouth, MN (US)

(*) Notice: Subject to any disclaimer, the term of this patent is extended or adjusted under 35 U.S.C. 154(b) by 225 days.

(21) Appl. No.: 18/738,816

(22) Filed: Jun. 10, 2024

(65) Prior Publication Data

US 2024/0408625 A1 Dec. 12, 2024

Related U.S. Application Data

(60) Provisional application No. 63/507,610, filed on Jun. 12, 2023.

(51) Int. Cl.

| | |
|---|---|
| ***B05B 1/30*** | (2006.01) |
| ***B05B 9/01*** | (2006.01) |
| ***B05B 12/00*** | (2018.01) |
| ***B05B 12/08*** | (2006.01) |
| ***B05B 13/04*** | (2006.01) |

(52) U.S. Cl.

CPC .............. *B05B 1/3013* (2013.01); *B05B 9/01* (2013.01); *B05B 12/002* (2013.01); *B05B 12/08* (2013.01); *B05B 13/0431* (2013.01)

(58) Field of Classification Search

CPC ....... B05B 1/3013; B05B 9/01; B05B 12/002; B05B 12/08; B05B 13/0431

See application file for complete search history.

(56) References Cited

U.S. PATENT DOCUMENTS

| | | | |
|---|---|---|---|
| 4,653,696 | A | 3/1987 | Rath et al. |
| 5,803,313 | A | 9/1998 | Flatt et al. |
| 2016/0084387 | A1 | 3/2016 | Hermes et al. |

(Continued)

FOREIGN PATENT DOCUMENTS

| | | | |
|---|---|---|---|
| CN | 109224350 | A | 1/2019 |
| CN | 107282344 | | 2/2019 |
| CN | 210207316 | U | 3/2020 |

(Continued)

OTHER PUBLICATIONS

International Search Report Written Opinion for International Application No. PCT/US2024/033344 dated Sep. 30, 2024, 10 pages.

*Primary Examiner* — Steven M Sutherland

(74) *Attorney, Agent, or Firm* — Christopher J. Volkmann; KELLY, HOLT & CHRISTENSON PLLC

(57) ABSTRACT

A spraying system includes a spray head having a spray tip, a valve actuatable between a closed position that restricts fluid flow to the spray tip and an open position that allows fluid flow to the spray tip, a first valve actuating mechanism operably coupled to the valve and manually actuatable by a user to actuate the valve to the open position, and a second valve actuating mechanism operably coupled to the valve. The spraying system includes a robotic assembly configured to removably receive the spray head. The robotic assembly includes a robotically actuatable control module configured to engage and actuate the second valve actuating mechanism to actuate the valve to the open position.

19 Claims, 17 Drawing Sheets

(56) References Cited

U.S. PATENT DOCUMENTS

| | | | |
|---|---|---|---|
| 2022/0226844 A1 | 7/2022 | Schmitz | |
| 2023/0060352 A1 | 3/2023 | Flatt et al. | |

FOREIGN PATENT DOCUMENTS

| | | | | | |
|---|---|---|---|---|---|
| CN | 111451023 A | * | 7/2020 | ............. | B05B 12/00 |
| CN | 112275506 A | | 1/2021 | | |
| CN | 111921731 B | | 7/2021 | | |
| CN | 213727371 U | | 7/2021 | | |
| CN | 112090612 B | | 10/2021 | | |
| CN | 215278017 U | | 12/2021 | | |
| CN | 114749311 A | | 7/2022 | | |
| CN | 114876162 A | | 8/2022 | | |
| CN | 114876163 A | | 8/2022 | | |
| CN | 218423485 U | | 2/2023 | | |
| CN | 218486379 U | | 2/2023 | | |
| CN | 218714770 U | | 3/2023 | | |
| CN | 117181482 A | | 12/2023 | | |
| GB | 1571893 A | * | 7/1980 | ............ | B25J 9/0081 |
| GN | 111451023 | | 4/2021 | | |

* cited by examiner

ROBOTIC SPRAY HEAD AND CONTROL SYSTEM

CROSS-REFERENCE TO RELATED APPLICATION

The present application is based on and claims the benefit of U.S. provisional patent application Ser. No. 63/507,610, filed Jun. 12, 2023, the contents of which are hereby incorporated by reference in their entirety.

BACKGROUND

A fluid spraying system can be used to spray a fluid from a fluid source to an application area. For example, paint can be sprayed by an applicator, such as a spray gun or head having a spray tip, to a wall or other target surface. Some spraying systems employ robotic components that support the applicator on a control module that controls the flow of paint through the spray tip (e.g., to start, stop, and/or control paint thickness, etc.). Further, the robotic components are carried on a movable frame having actuators that control the positioning of the spray tip relative to the surface.

The discussion above is merely provided for general background information and is not intended to be used as an aid in determining the scope of the claimed subject matter. The claimed subject matter is not limited to implementations that solve any or all disadvantages noted in the background.

SUMMARY

A spraying system includes a spray head having a spray tip, a valve actuatable between a closed position that restricts fluid flow to the spray tip and an open position that allows fluid flow to the spray tip, a first valve actuating mechanism operably coupled to the valve and manually actuatable by a user to actuate the valve to the open position, and a second valve actuating mechanism operably coupled to the valve. The spraying system includes a robotic assembly configured to removably receive the spray head. The robotic assembly includes a robotically actuatable control module configured to engage and actuate the second valve actuating mechanism to actuate the valve to the open position.

These and various other features and advantages will be apparent from a reading of the following Detailed Description. This Summary and Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3-1 and 3-2 (collectively referred to as FIG. 3) illustrate operation of a robotic spraying system, in one example.

FIGS. 4-1, 4-2, and 4-3 (collectively referred to as FIG. 4) illustrate an example airless spray head.

FIGS. 5-1, 5-2, 5-3, and 5-4 (collectively referred to as FIG. 5) illustrate an example airless spray head coupled to a robotic control assembly.

FIGS. 6-1 and 6-2 (collectively referred to as FIG. 6) illustrate an example tip housing assembly.

FIGS. 7-1 and 7-2 (collectively referred to as FIG. 7) illustrate an example tip housing being removably coupled to a spray tip.

FIGS. 8-1 and 8-2 (collectively referred to as FIG. 8) illustrate an example spray tip.

FIGS. 9-1 and 9-2 (collectively referred to as FIG. 9) illustrate an example removable spray handle.

Figure 1:
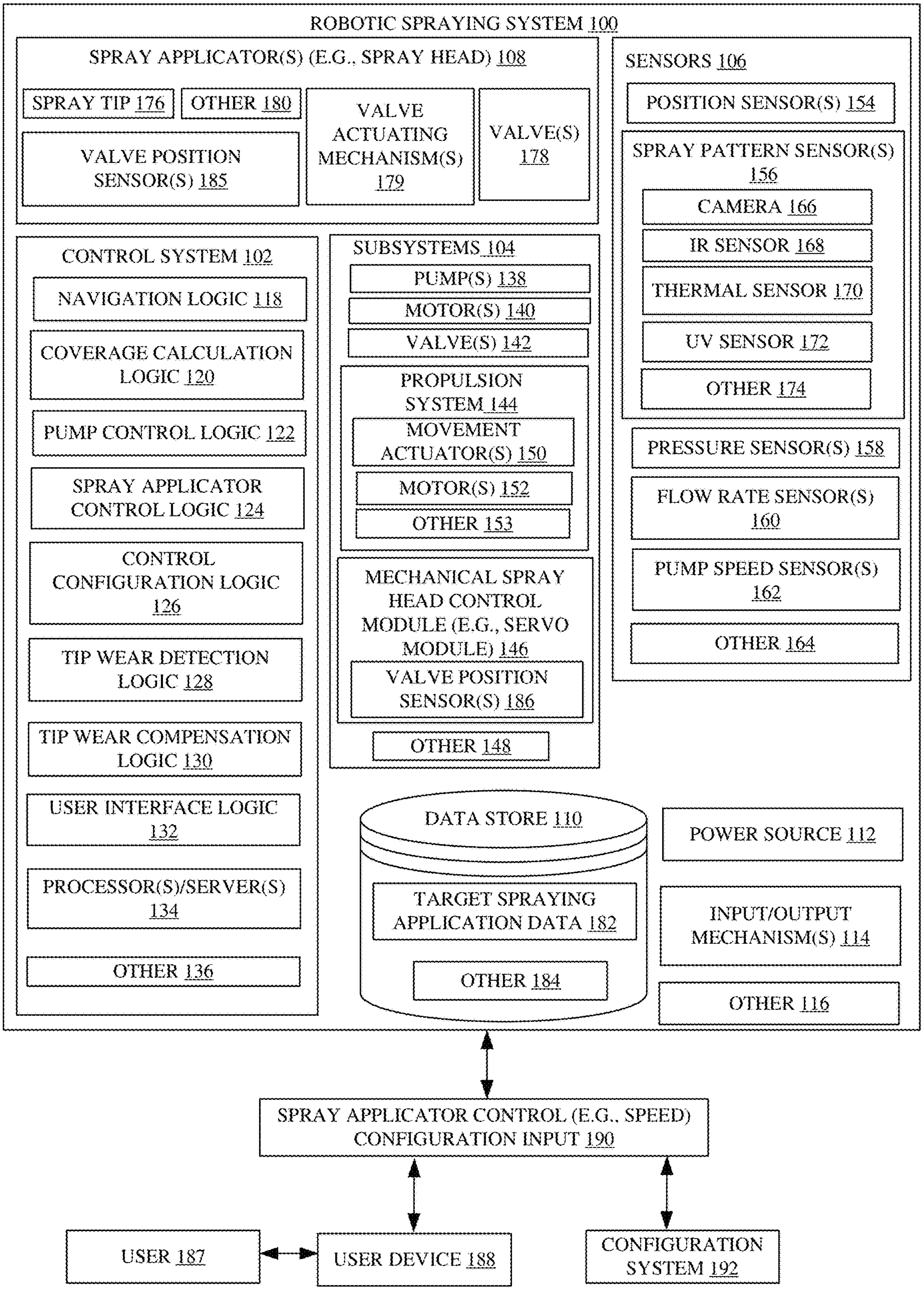
FIG. 1 is a schematic block diagram of a robotic spraying system, in one example.

While the above-identified figures set forth one or more examples of the disclosed subject matter, other examples are also contemplated, as noted in the disclosure. In all cases, this disclosure presents the disclosed subject matter by way of representation and not limitation. It should be understood that numerous other modifications and examples can be devised by those skilled in the art which fall within the scope and spirit of the principles of this disclosure.

DETAILED DESCRIPTION OF THE DRAWINGS

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

Further, while some examples are described herein in the context of applying paint to a surface, it is understood that the concepts are not limited to these particular applications. Other applications include applying other types of fluids, such as, but not limited to, foams, textured materials, adhesive components, food products, water, disinfectants, to name a few.

As used herein, "paint" includes substances composed of coloring matter, or pigments, suspended in a liquid medium as well as substances that are free of coloring matter or pigment. Paint can include preparatory coatings, such as primers, and can be opaque, transparent, or semi-transparent. Some particular examples include, but are not limited to, latex paint, oil-based paint, stain, lacquers, varnishes, inks, etc.

Further yet, some examples are discussed herein in the context of "airless" spraying systems which typically spray fluid by pressurizing the fluid through a positive displacement pump (e.g., a piston pump driven by an electric motor), or other type of pumping system, to a pressure that results in atomization of the fluid from a spray tip having a geometry configured to emit a particular spray pattern (e.g., a round pattern, a flat pattern, a fan pattern, etc.). However, it is expressly contemplated that the present features can also be utilized with other types of sprayers, such as air driven or air pressurized sprayers, that utilize an air compressor, air turbine, or other air source that generates air flow to spray the fluid.

Robotic spraying systems can be utilized in spraying operations to at least partially automate, or otherwise increase the overall efficiency of, a spraying operation. For example, a robotic sprayer can be controlled to undergo a spraying operation on a target surface. While robotic sprayers are advantageous in their ability to automate a spraying operation, robotic systems are often limited in their capability of allowing for manual operation or intervention by a user. For instance, a user may want to manually operate the spraying system to apply an additional coat of paint to a target surface, apply a coat of paint to an area where the robotic sprayer has missed, change paint colors, etc. However, due to the inflexibility of conventional robotic spraying systems in how they can be actuated (e.g., only being actuatable by the robotic assembly), a separate spraying system that is manually actuatable is typically needed.

Accordingly, examples set forth in the present application utilize a spraying system having a spray control valve with at least two separate modes of valve actuation. Illustratively, the present features facilitate conversion of a spray head between a robotically controlled mode and manually actuatable mode. In examples described below, the spray head includes a first actuator (e.g., a finger trigger) that enables manual actuation of the valve by a user. The spray head also includes a second actuator that can be easily coupled (e.g., without the use of tools) to a robotic control assembly such that the robotic control assembly can robotically actuate the spray control valve. Additionally, as set forth below, the second actuator is configured such that the first actuator is manually actuatable when the robotic control assembly is coupled to the second actuator. In this way, both robotically controlled and manually controlled actuation of the valve can occur without having to decouple the spray head from the robotic control assembly. Leveraging a system that includes both a robotically controllable and manually controllable actuator allows the user to conveniently apply additional paint coatings, apply a coating where the robotic system has missed, change paint, check tip maintenance (e.g., clogging), etc., without having to completely disassemble the spraying system or use a separate, manually actuatable spraying system.

Further, as the spray head is activated and deactivated (e.g., as a spray control valve is opened and closed), spitting can occur. Spitting is the expulsion of droplets or uneven bursts of fluid instead of in a smooth and even pattern. Spitting can result in inconsistent finish on the target surface, application of fluid on non-target surfaces, wasted fluid, and additional labor for touch-up. There are at least two forms of spitting, referred to start spitting (or starting spit) and stop spitting (or stopping spit). Start spitting occurs when the gun is activated (e.g., valve is opened) and results from too slow a pressurization of the fluid volume downstream of the valve (which includes the fluid volume of the spray tip as well as other items). Stop spitting occurs when the gun is deactivated (e.g., valve is closed) and results from too slow a depressurization of the fluid volume downstream of the valve. A number of factors influence the occurrence and severity of spitting, such as the size of the fluid volume downstream of the valve, how quickly the valve can open and close, the pressure accumulation of the fluid volume downstream of the valve, as well as other factors.

To compensate for spitting, an example described in the present disclosure utilizes a speed control parameter to control the speed at which the control module opens and closes the spray head. Through adjustment of the opening and/or closing speed, the effects of spitting can be reduced, if not eliminated.

FIG. 1 is a schematic block diagram of one example of a robotic spraying system 100. System 100 is illustratively an autonomous or semi-autonomous system machine for performing a spraying application with some, or all, spraying tasks being performed with a degree of autonomy. For example, system 100 can generate or plan a path for the spray tip to achieve a target coverage (e.g., area and thickness), and the spray tip can be automatically moved (e.g., distance and speed relative to the surface) through control of actuators and spray control valve(s) are opened/closed through automation to achieve a target spray coverage area and/or thickness.

Example autonomous machines can perform ground-based operations, such as traversing the ground or floor to spray a vertical surface. Other examples include aerial vehicles, such as an unmanned aerial vehicle (UAV) or drone.

System 100 includes a control system 102 configured to control one or more subsystems 104 and receive sensor signals from one or more sensors 106. System 100 includes one or more spray applicators 108, a data store 110, a power source 112 (such as one or more batteries), input/output mechanism(s) 114, and can include other items 116 as well. For sake of illustration, but not by limitation, spray applicators 108 will be discussed in the context of a spray head (also referred to herein as spray head 108).

Control system 102 includes navigation logic 118, coverage calculation logic 120, pump control logic 122, spray applicator control logic 124, control configuration logic 126, tip wear detection logic 128, tip wear compensation logic 130, user interface logic 132, one or more processors and/or server(s) 134, and can include other items 136 as well.

Subsystem 104 includes one or more pumps 138, one or more motors 140, one or more valves 142, a propulsion system 144, mechanical spray head control module 146, and can include other items 148 as well.

Propulsion system 144 is configured to move system 100 about a worksite and includes one or more movement actuators 150, one or more motors 152, and can include other items 153 as well.

Sensors 106 include one or more position sensors 154, one or more spray pattern sensors 156, one or more pressure sensors 158, one or more flow rate sensors 160, one or more pump speed sensors 162, and can include other sensors 164 as well.

Spray pattern sensor(s) 156 can include a camera 166, an infrared (IR) sensor 168, a thermal sensor 20, an ultraviolet (UV) sensor 22, and can include other sensors 24 as well. For example, the sensor signals from sensor(s) 156 can provide information relating to paint application, spray edges (e.g., locations of spray edges), spray density (e.g., thickness), spray angles, etc.

Spray applicator 108 includes a spray tip 176, one or more valves 178, one or more valve actuating mechanisms 179, and can include other items 180 as well. Data store 110 can include any of a variety of data items for controlling spraying system 100 or logging operation of spraying system 100. For example, data store 110 can store target spraying application data 182 and can include other data items 184 as well.

Control system 102 is configured to control operation of system 100 based on sensor signals from sensors 106 and other inputs, such as target spraying application data 182 which defines the target coverage (the surface location and area, coating thickness, etc.). Data 182 can be received by spraying system 100 in any of a number of ways. For example, it can be transmitted from a remote computing system, such as a server or a mobile device, or can be input directly into system 100, such as by a user interacting with user input devices (not shown in FIG. 1).

Navigation logic 118 receives position sensor signals from position sensors 154. The position sensor signals can indicate a relative position of the robotic spraying system 100, relative to the surface to be painted. For example, the position sensor signal can indicate a distance of the spray tip from the surface to be sprayed, a distance of the spray tip from the ground, to name a few. Examples of position sensor 154 include radar sensors, global positioning system (GPS) sensors, for example.

Navigation logic 118 receives the signals and controls a path of spray tip 176 to achieve the desired spraying application. For example, the control can include planning a series of parallel passes along the surface and a desired speed of the spray tip to achieve a desired paint coating coverage and thickness.

Coverage calculation logic 120 is configured to calculate the spray coverage (e.g., thickness, area, etc.) based on operating characteristics, such as flow rate, spray pattern, pressure, etc. In one example, discussed in further detail below, logic 120 calculates the mil thickness of the paint on the surface based on an indication of the flow rate of the paint through the orifice and an indication of the area of the surface being covered with the current pass, which can be based on sensor signals from sensors 154 and/or 156. The speed and/or distance of the spray tip relative to the surface can be adjusted to achieve a target mil thickness.

Pump control logic 122 is configured to control pump 138, such as by controlling the speed of motor 140 driving pump 138, to achieve a desired pressure and/or flow rate of the paint to spray tip 176.

Tip wear detection logic 128 is configured to detect a tip wear status of spray tip 176. Some examples are discussed above. Briefly, however, tip wear detection logic 128 can determine a current spray tip orifice size based on current operational characteristics, such as pressure and flow rate, and compare the current tip size to a first tip size, which can be the initial or manufactured tip size. The change in tip size can be correlated to a tip wear or remaining tip life.

Tip wear compensation logic 130 is configured to control subsystems 104 to compensate for the tip wear detected by logic 128. Examples are discussed in further detail below. Briefly, however, as spray tip 176 wears, the tip orifice becomes larger, which can result in changes in the spray pattern and amount of paint being released from the spray tip orifice. To illustrate, without changes to the distance of the spray tip to the surface or speed at which the spray tip is moved relative to the surface, the spray pattern may become narrowed (less area being covered by the spray pattern) and the thickness of the paint coating can increase. Examples of compensating for tip wear include, but are not limited to, automatically increasing the distance of spray tip 176 from the surface, increasing the lateral speed at which spray tip 176 moves relative to the surface, to name a few.

Spray pattern sensors 156 are configured to generate sensor signals indicative of the spray pattern released from spray tip 176. For example, camera 166 can acquire images of the spray pattern as it travels from spray tip 176 to the surface. Alternatively, or in addition, sensors 168, 170, and/or 172 can generate sensor signals indicating the area of the surface being covered by the current pass of the spray tip 176 along the surface.

Pressure sensors 158 return an indication of the pressure of the paint released from spray tip 176. This can include receiving an indication of the commanded pressure being used to control pump 138. Alternatively, or in addition, one or more pressure transducers can be positioned along the paint flow path to spray tip 176.

Flow rate sensors 160 generates a flow rate sensor signal indicative of the flow rate of the paint through spray tip 176. In one example, a flow rate sensor can be disposed along the flow path to measure the flow rate, such as in gallons per minute (GPM). Alternatively, or in addition, an indication of flow rate can be determined based on pump speed (based on signals from pump speed sensor 162). For example, in the case of a piston pump, the cycles or strokes per minute and pump displacement per stroke can be utilized to determine the flow rate of the paint being output from the pump.

Valve(s) 178 are configured to control the flow of paint to spray tip 176. For example, a needle valve can be configured to actuate between open and close positioned to control the flow of paint from spray tip 176. Valve 178 can be controlled by navigation logic 118 to achieve the target spraying application. Additionally, navigation logic 118 can control operation of spraying system 100 based on environmental characteristics, such as temperature, wind speed, humidity, etc.

Valve actuating mechanism(s) 179 are operably coupled to valve(s) 178 and configured to control opening and closing of valve(s) 178. In an example discussed in further detail below, mechanism(s) 179 includes a first valve actuating mechanism operably coupled to the valve and manually actuatable by a user to actuate the valve to the open position and a second valve actuating mechanism operably coupled to the valve and configured to be engaged to control module 146 to facilitate control of valve(s) 179 by control module 146.

System 100 includes one or more valve position sensors configured to generate sensor signals indicative of a position or an opening status of valve(s) 178. The sensor signals can indicate that the valve(s) 178 are fully open, fully closed, or a particular position between fully open and fully closed (e.g., twenty five percent open, half open, etc.).

Illustratively, in one example, spray head 108 can include a valve position sensor 185 and/or control module 146 can include a valve position sensor 186. In one example, valve position sensors 185 and/or 186 include a rotary potentiometer that generates a sensor signal indicative of a rotational position. For instance, sensor 185 is configured to generate a sensor signal indicative of a rotational position of one or more mechanism(s) 179 and sensor 186 is configured to generate a sensor signal indicative of a rotational position of control module 146. The sensor signals can be provided as feedback to control system 102 as to which status system 100 is currently in, e.g., based on the real open angle.

Propulsion system 144 is configured to move spraying system 100 relative to the surface to be sprayed, and is controlled by navigation logic 118. For example, one or more movement actuators 150 are driven by motor 152 to move spray tip 176 in six degrees of freedom. For example, in the case of a ground robot, movement actuators 150 can include wheels or tracks configured to convey system 100 over the ground. Actuators 150 can also include actuators that move the spray tip relative to the ground engaging elements (such as by raising and lowering the spray tip relative to the wheels or tracks). In the case of an aerial robot, movement actuator 150 can include rotors that move system 100 through the air. Further, spray tip 176 can be mounted to system 100 using a controllable gimbal assembly.

Mechanical spray head control module 146 is configured to receive and control spray head (or other actuator(s)) 108.

Examples of module 146 are described in further detail below. Briefly, however, module 146 is configured to mechanically actuate spray head 108 to robotically control when valve 178 opens and closes. In one example, module 146 includes a servo module having a rotary actuator that rotates a valve actuating mechanism on spray head 108.

Spray applicator control logic 124 is configured to control module 146 to control when spray head 108 sprays fluid from spray tip 176. For example, control logic 124 can control the opening and/or closing speed of valve(s) 178.

Control configuration logic 126 operates to configure control logic 124, for example to control the speed at which logic 124 controls module 146 to open and/or close valve(s) 178 of spray head 108.

Examples of configuring control of spray head 108 are discussed in further detail below. Briefly, however, a configuration input can define, for example, a speed at which valve 178 is opened in response to a control input to begin spraying from spray tip 176. Also, a valve closing speed can be configured. A valve opening set point can be set or adjusted by logic 126 as well. For instance, in the case of module 146 including a rotary actuator, a configuration input can define the angular position of the rotary actuator to mechanically actuate valve 178 to a fully open position. For sake of illustration, but not by limitation, configuration logic 126 can configure control logic 124 to rotate the rotary actuator fifteen degrees within a particular time frame (e.g., x milliseconds) when a control input to begin spraying is received.

User interface logic 132 is configured to receive inputs and/or generate outputs using mechanisms 114. For instance, inputs can be received from a user 187 through a user device 188. In one example, user device 188 can include a remote device, such as a portable hand-held computing device (e.g., a cell phone). In another example, user device 188 can include a display device and/or user input controls onboard of spraying system 100.

Spray applicator control configuration input 190 is received from user device 188 and/or a configuration system 192, for use by configuration logic 126 in configuring control logic 124. In one example, configuration system 192 can be utilized during a manufacturing and/or pre-operation setup process of robotic spraying system 100.

Figure 2:
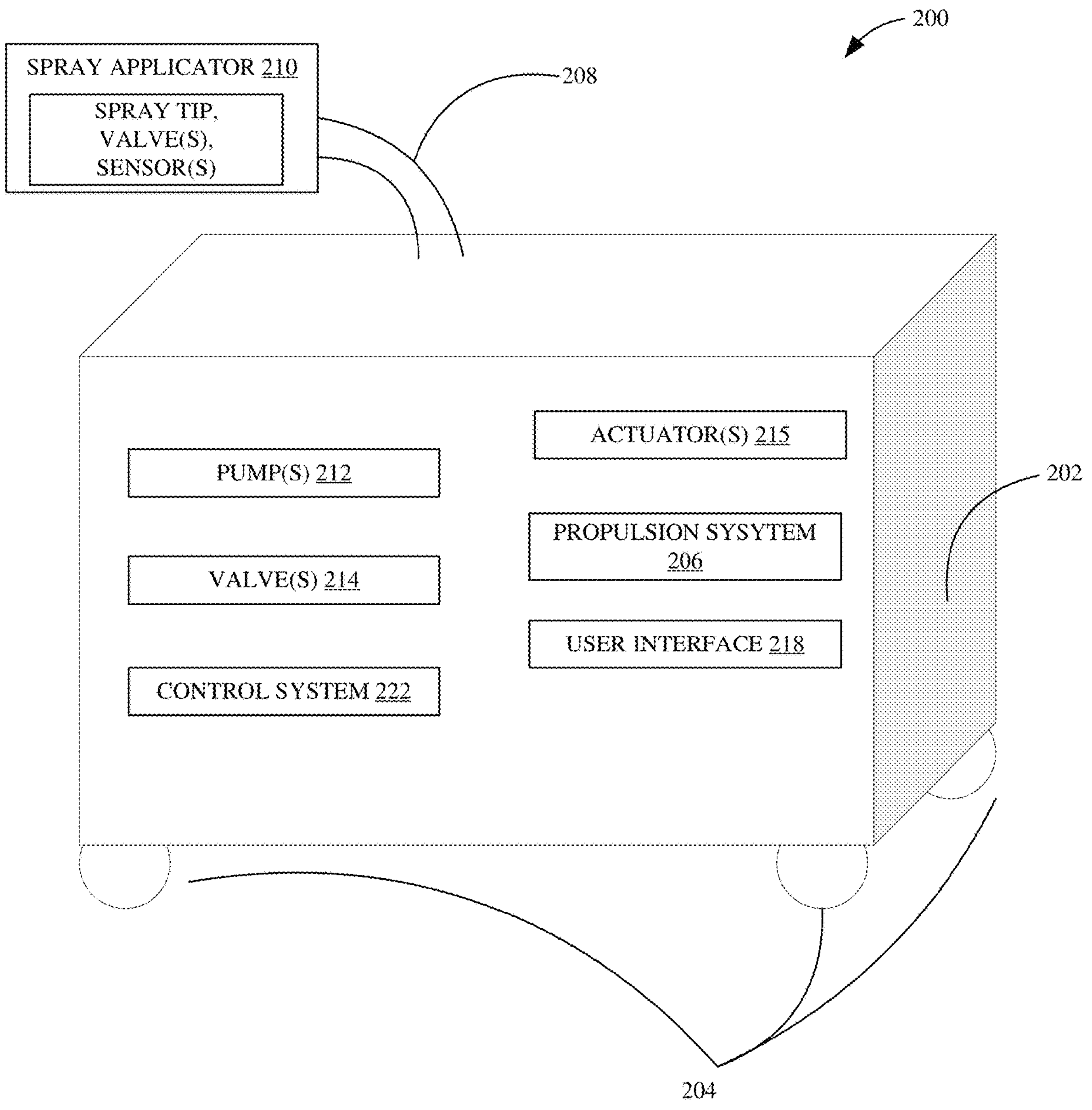
FIG. 2 is a diagrammatic view of one example of a robotic spraying system.

FIG. 2 is a diagrammatic view of one example of a robotic spraying system 200. System 200 illustratively includes a ground robot. System 200 includes a cart 202 configured to house various components of system 200. System 200 includes one or more ground engaging elements 204, such as wheels or tracks, coupled to cart 202. Ground engaging elements 204 are driven by a propulsion system to provide movement of spraying system 200. Additionally, cart 202 includes an arm 208 configured to support spray applicator 210. Robotic arm 208 is movable to any of a variety of different lengths to support spray applicator 210, which includes a spray tip, valves, sensors, etc. Examples of sensors includes sensors 106, discussed above.

Spraying system 200 includes pumps 212 and valves 214. System 200 also includes actuator 215 configured to drive one or more of propulsion system 206, robotic arm 208, and pump 212. Control system 222 is configured to control the components of system 200. One example of control system 222 includes control system 102 discussed above with respect to FIG. 1. Also, system 200 can include a user interface 218 that allows an operator to initiate and/or modify the operation of system 200.

Figures 1, 3:
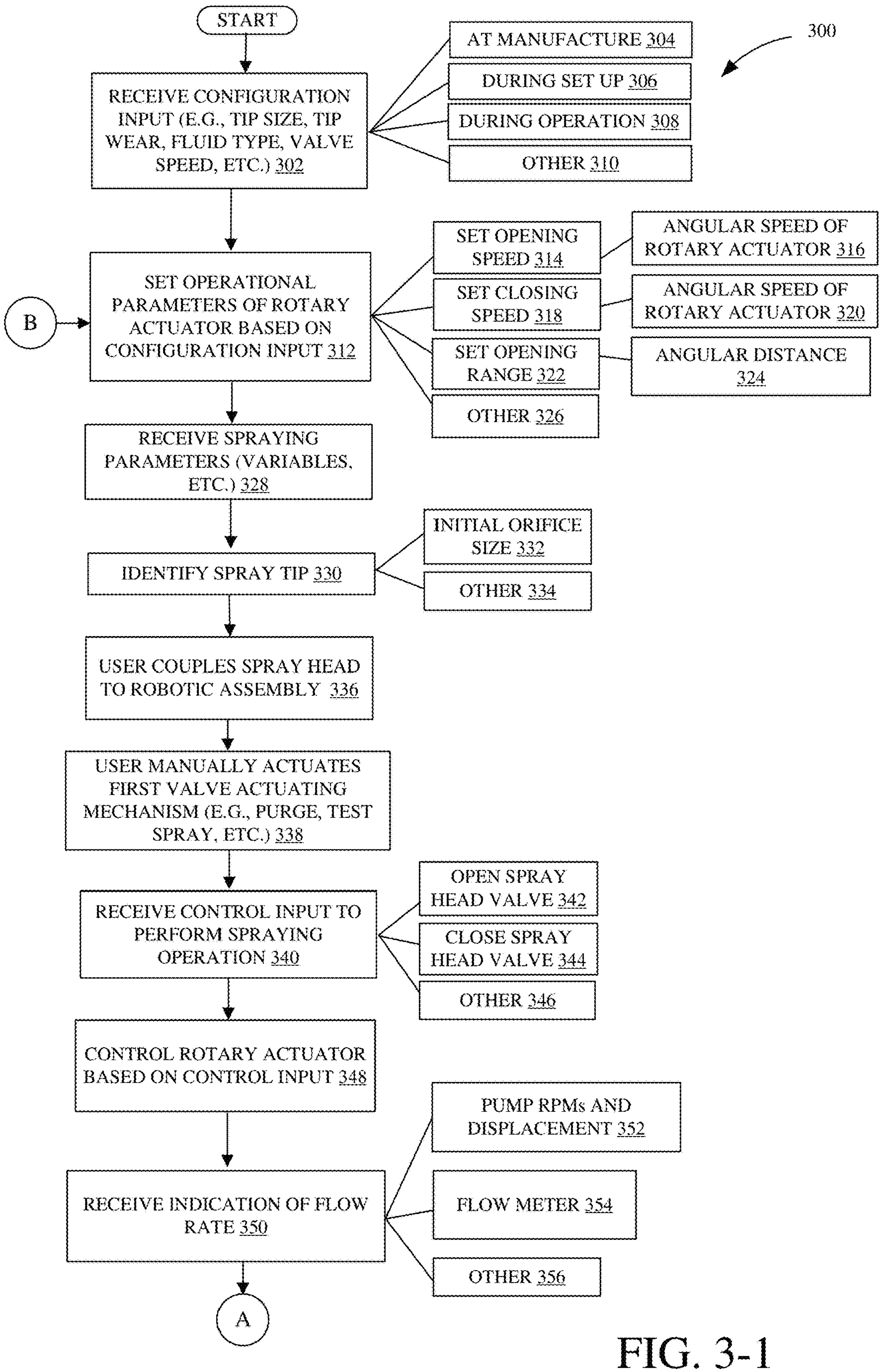
Figures 2, 3:
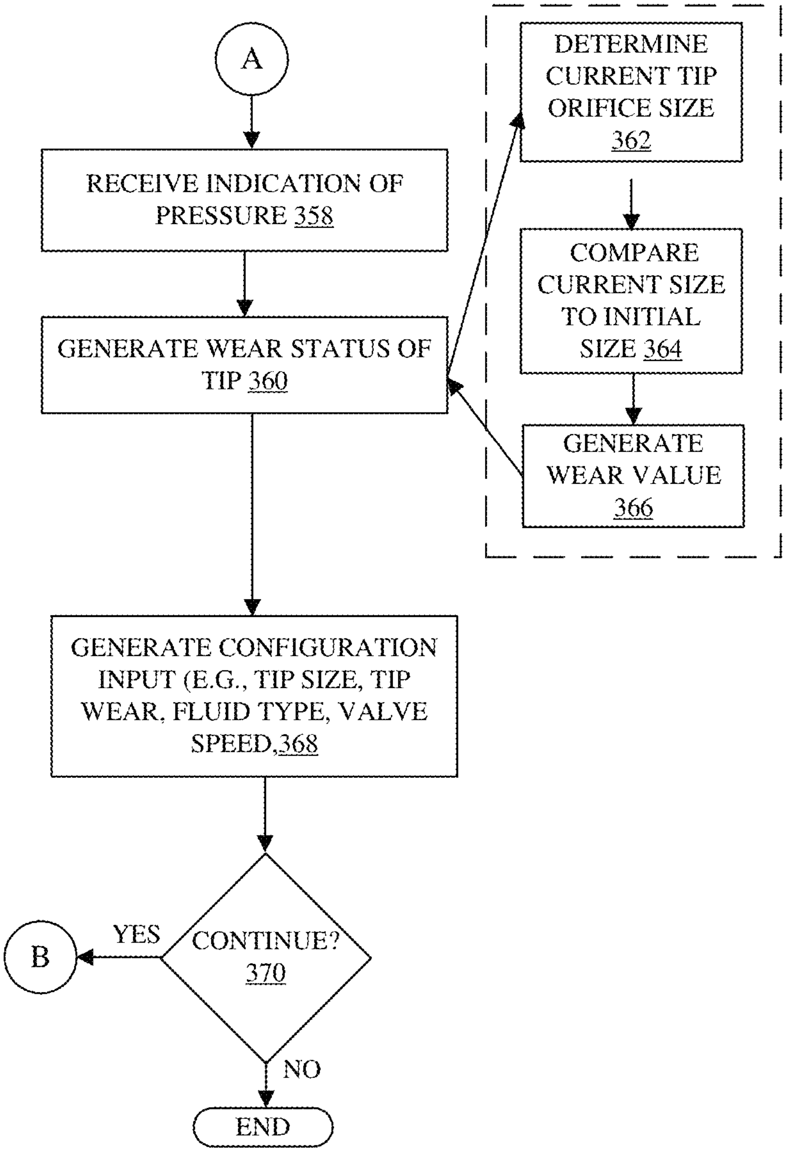

FIGS. 3-1 and 3-2 (collectively referred to as FIG. 3) illustrate an example operation of a robotic spraying system. For sake of illustration, but not by limitation, FIG. 3 will be discussed in the context of system 100 illustrated in FIG. 1.

At block 302, configuration input 190 is received by control configuration logic 126. As noted above, configuration input 190 can be received at any of a variety of times, including, but not limited to, at manufacture of robotic spraying system 100, during an initial setup process 306, during operation 308, or otherwise 310. The configuration input can indicate any of a wide variety of operational aspects of robotic spraying system 100. For instance, the configuration input can indicate the tip size of spray tip 176, tip wear of spray tip 176, a user-desired valve speed, and can indicate other things as well.

At block 312, one or more operational parameters of mechanical spray head control module 146 are set based on the configuration input received at block 302.

In one example, the opening speed is set at block 314. In the case of a rotary actuator, block 316 sets the angular rotation speed at which control logic 124 rotates the rotary actuator to rotate the valve actuating mechanism of spray head 108, in response to a control input to beginning spraying. Alternatively, or in addition, the closing speed can be set at block 318. At block 320, the angular rotation speed is set to control how quickly the valve of spray head 108 closes in response to a control input to stop spraying.

Alternatively, or in addition, the opening range can be set at block 322. For instance, block 322 can include setting the angular distance (block 324) that the rotary actuator will travel in response to a control input to open valve 178 to commence spraying. Of course, other operational parameters can be set, as represented at block 326.

At block 328, spraying parameters for a target spraying operation to be performed are received. Examples include, but are not limited to, target spraying application data, target coverage data indicating a target area to be sprayed, a target thickness, a target spraying time, as well as other parameters. The spraying parameters can also include parameters associated with operation of robotic spraying system 100. For instance, a correction factor representing pump efficiency, pressure losses in the paint path, and/or other factors that represent a relationship between a control input and paint pressure at spray tip 176.

At block 330, spray tip 176 is identified by control system 102. For instance, the spray tip can be identified in any of a number of ways. For instance, an operator can input the characteristics of the spray tip, such as the initial orifice size, represented at block 332. In other examples, the initial orifice size can be automatically detected by control system 102. The spray tip can be identified in other ways as well, as represented at block 334.

At block 336, an operator or user couples spray head 108 to control module 146. At block 338, the user can manually actuate a first valve actuating mechanism of spray head 108 while spray head 108 is coupled to control module 146, to cause opening of valve 178, to some extent, so fluid can flow through spray tip 176. In this way, the user can manually actuate spray head 108 to purge the fluid pump, valves, and/or lines, to perform a test spray, or for other reasons, without having to decouple spray head 108 from control module 146.

At block 340, a control input is received for a target spraying operation to be performed at least partially autonomously. Examples include a control input to open valve 178 (block 342), close valve 178 (block 344), or other control of spray head 108 (block 346). At block 348, control module 146 is controlled by control logic 124 to actuate a second valve actuating mechanism of spray head 108.

During the spraying operation, an indication of flow rate can be received at block 350. One example includes receiving sensor signals indicative of pump speed (e.g., in terms of cycles or revolutions per minute), and the displacement of the pump with each cycle, as is represented at block 352. In one example, the pump speed is determined based on an indication of motor speed of the motor that drives the pump and a predefined relationship between the motor speed and the pump speed (e.g., a gear reduction, etc.). Alternatively, or in addition, a sensor can be received from a flow meter, as represented at block 354. Of course, the indication of flow rate can be received in other ways as well, as represented at block 356.

At block 358, an indication of the paint pressure is received. The indication can include, for example, a signal from pressure sensor 158. At block 360, an indication of wear status of spray tip 176 is generated. The wear status can indicate a remaining tip life. One example includes determining the current tip orifice size at block 362. The current tip orifice size can be determined, as discussed above. At block 364, the current tip size is compared to the initial tip size identified at block 332. Based on the comparison, a wear value or metric is generated at block 366.

At block 368, a configuration input is generated by configuration logic 126. For instance, an indication of a detected wear of spray tip 176, a fluid type, and/or a valve speed setting input can be received. In one example, a user can provide an input to increase or decrease the valve opening and/or closing speed based on observed characteristics of the spray pattern. For instance, if the user observes that spitting is occurring when the spray head is opened or closed, the operator can provide an input to increase or decrease the actuation speed, to mitigate the spitting effects. The increase or decrease can be done in discreet increments, between a minimum speed and a maximum speed, or can be otherwise set by the user.

At block 370, the operation returns to block 312 if the spraying operation is continued.

FIGS. 4-1, 4-2, and 4-3 (collectively referred to as FIG. 4) illustrate an example airless spray head 400 (e.g., spray head 108). As described in more detail below, spray head 400 can be utilized with a robotic control assembly (e.g., module 146), but is also manually actuatable by a user. Spray head 400 illustratively includes body 402 configured to couple to fluid line 404. Fluid line 404 can be coupled to body 402 by, for example, coupler 406. Coupler 406 is illustratively shown as a threaded coupler. However, it is expressly contemplated that other couplers can be used to couple fluid line 404 to body 402 as well.

Figures 1, 4:
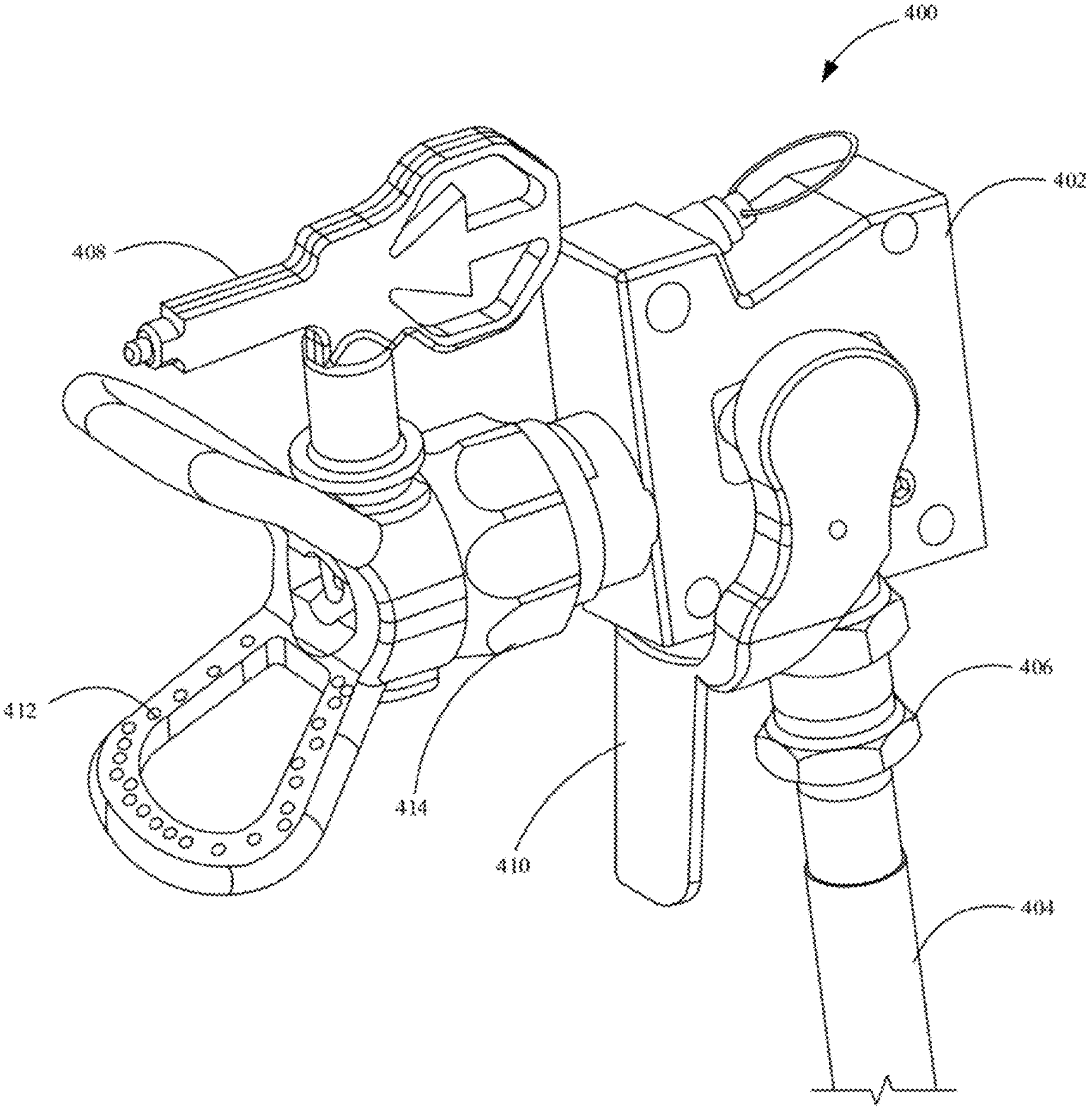
Figures 2, 4:
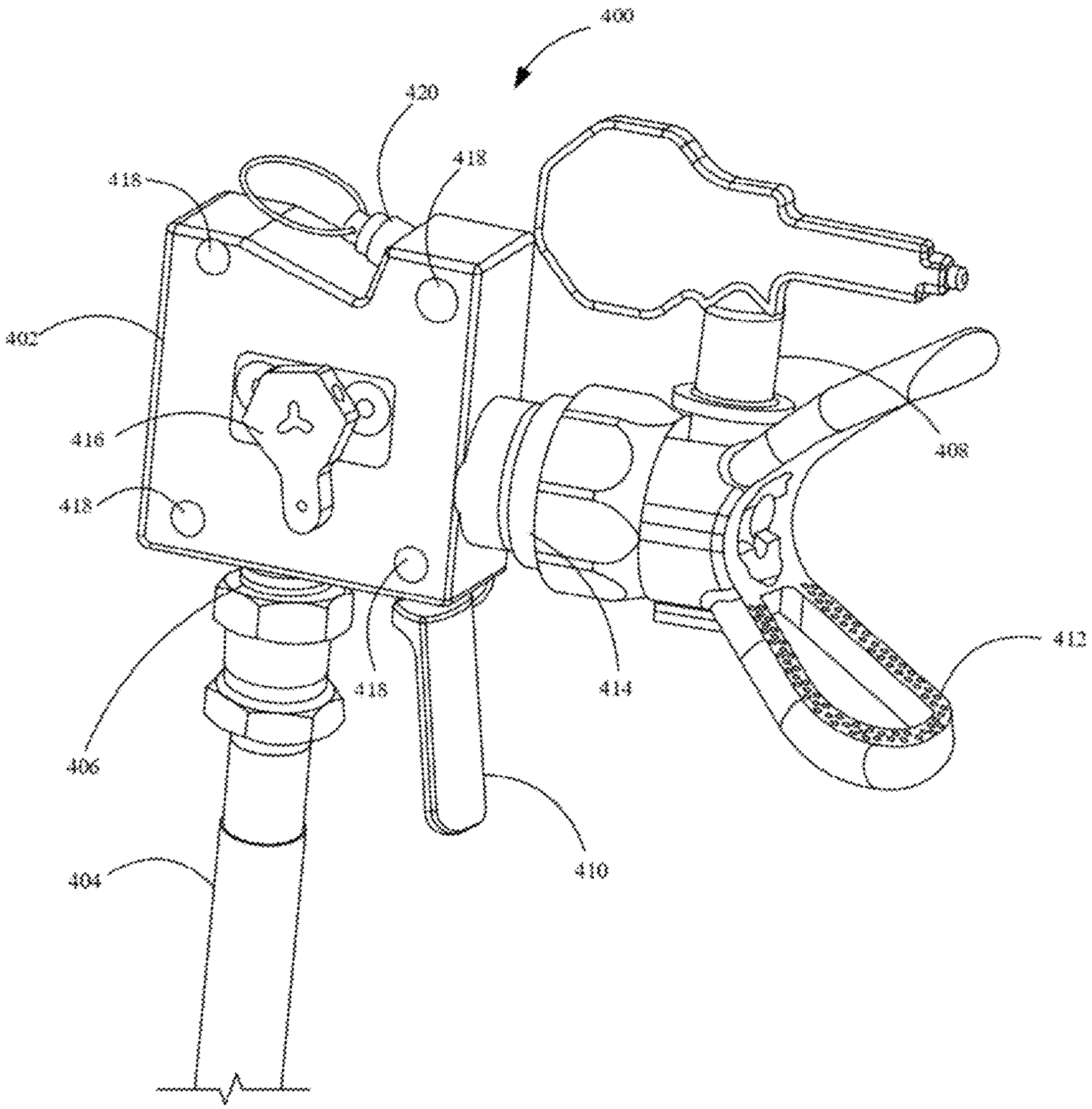
Figures 3, 4:
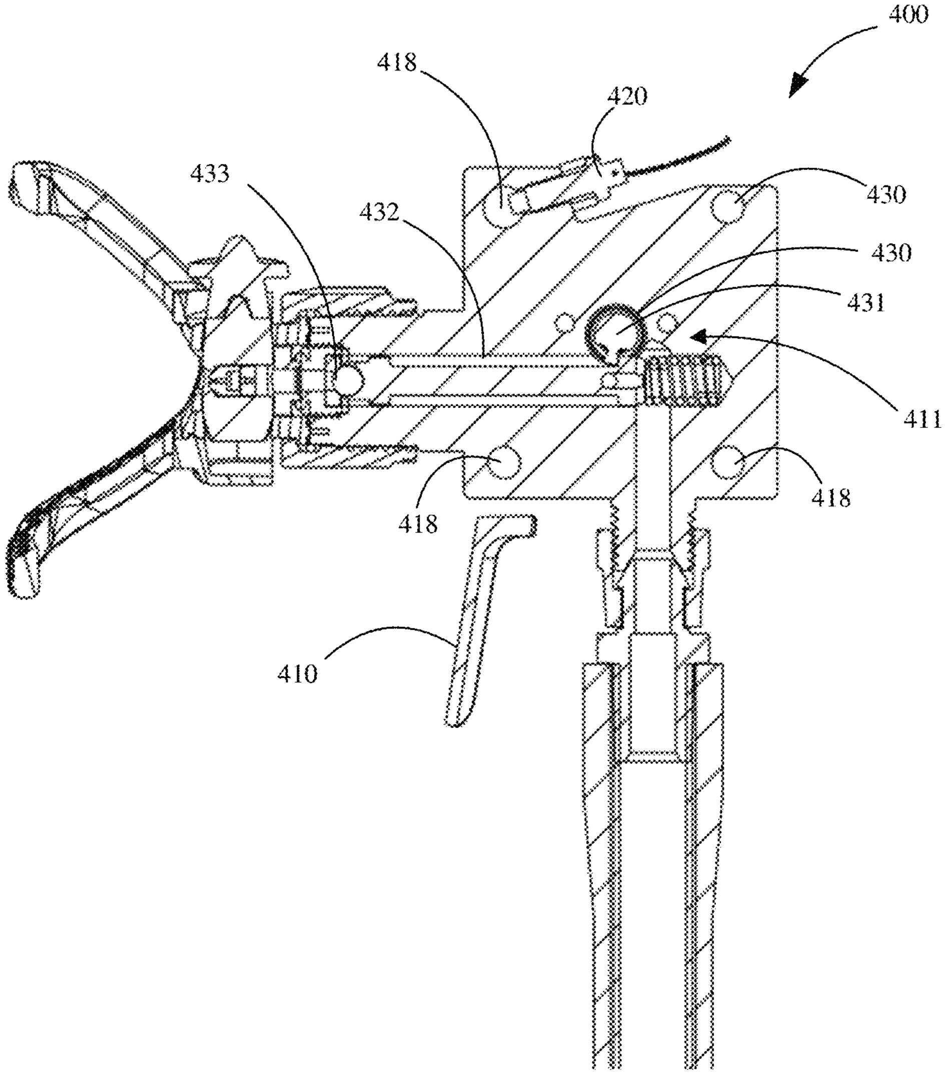
Figures 1, 5:
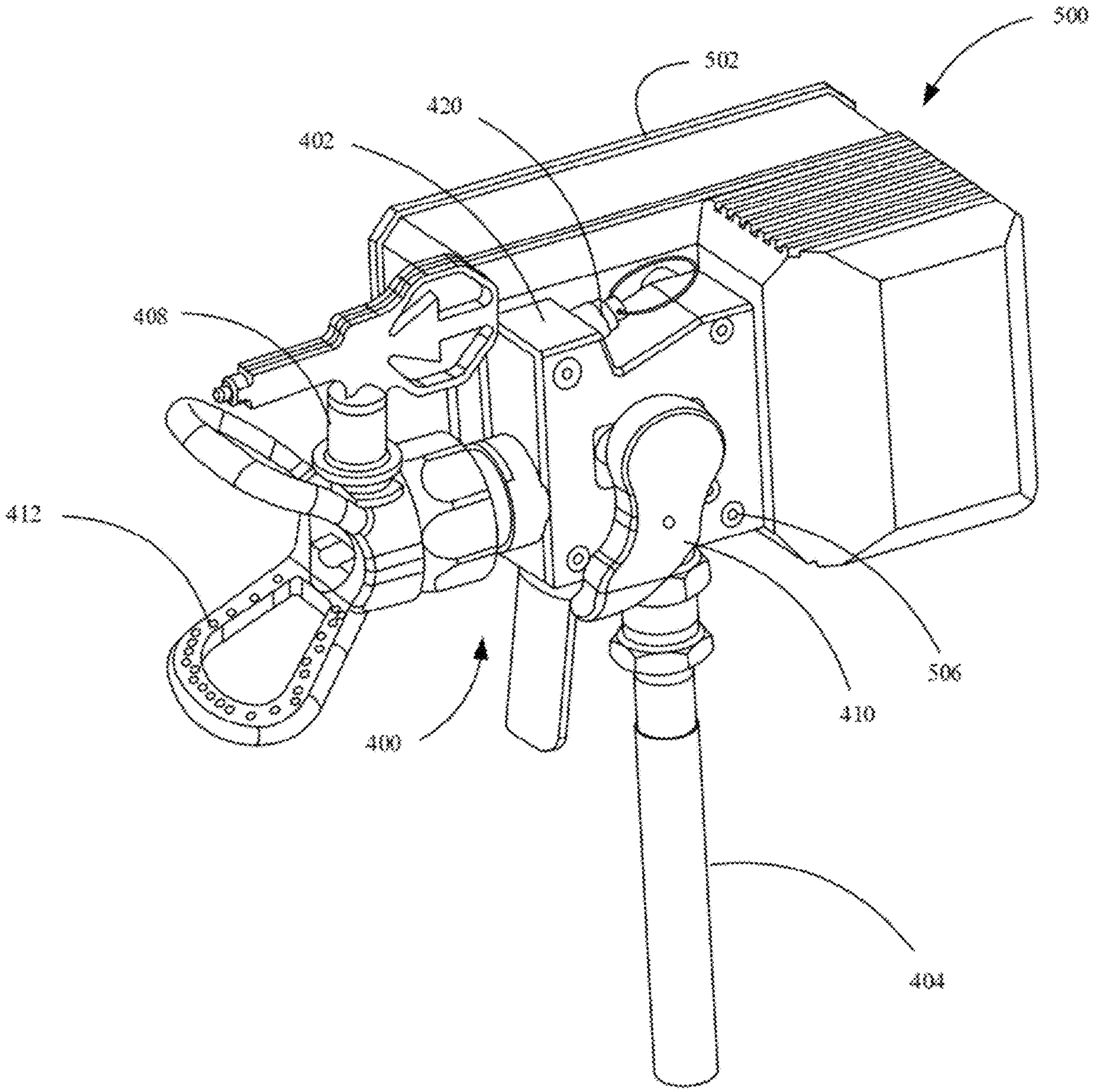
Figures 2, 5:
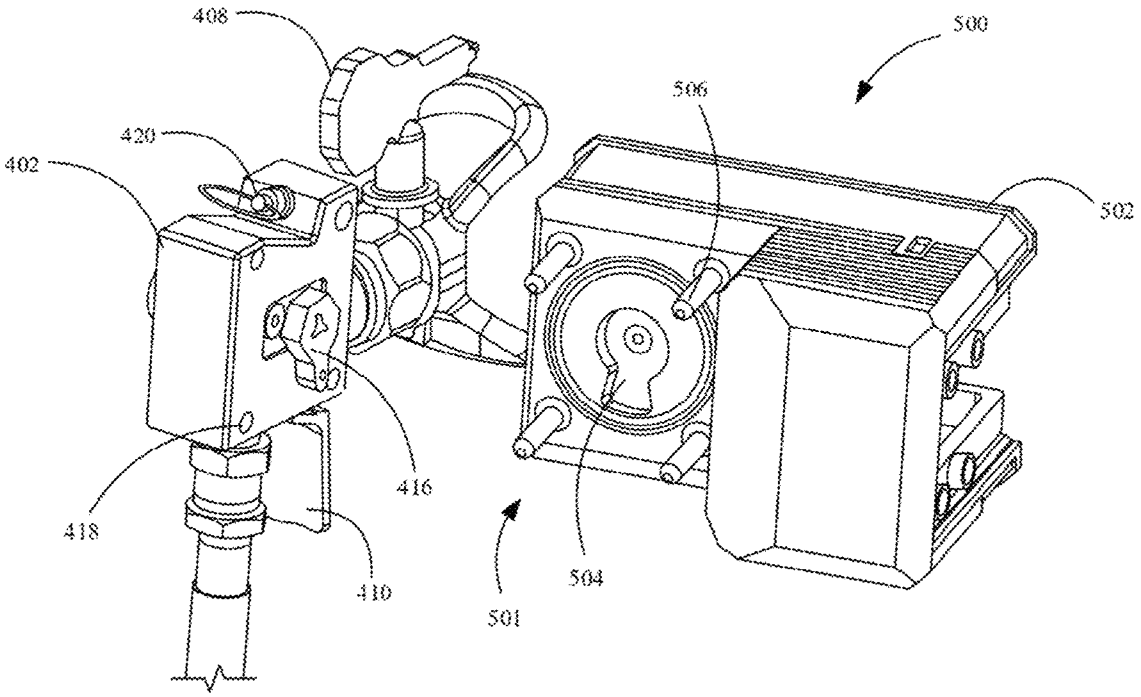
Figures 3, 5:
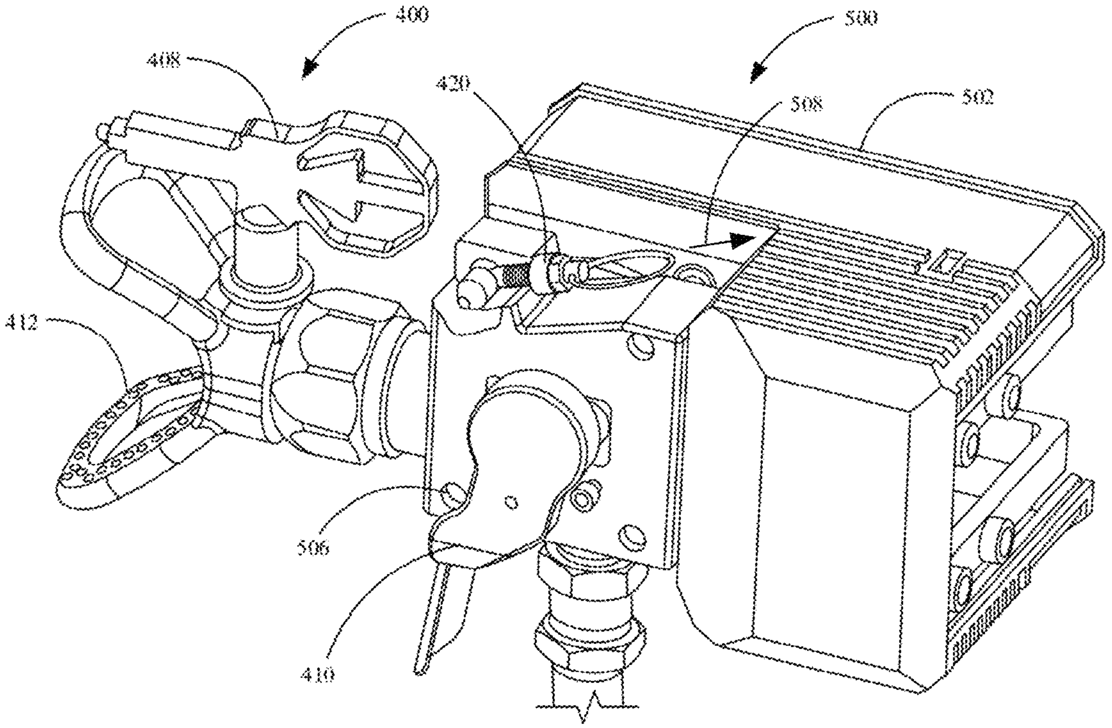
Figures 4, 5:
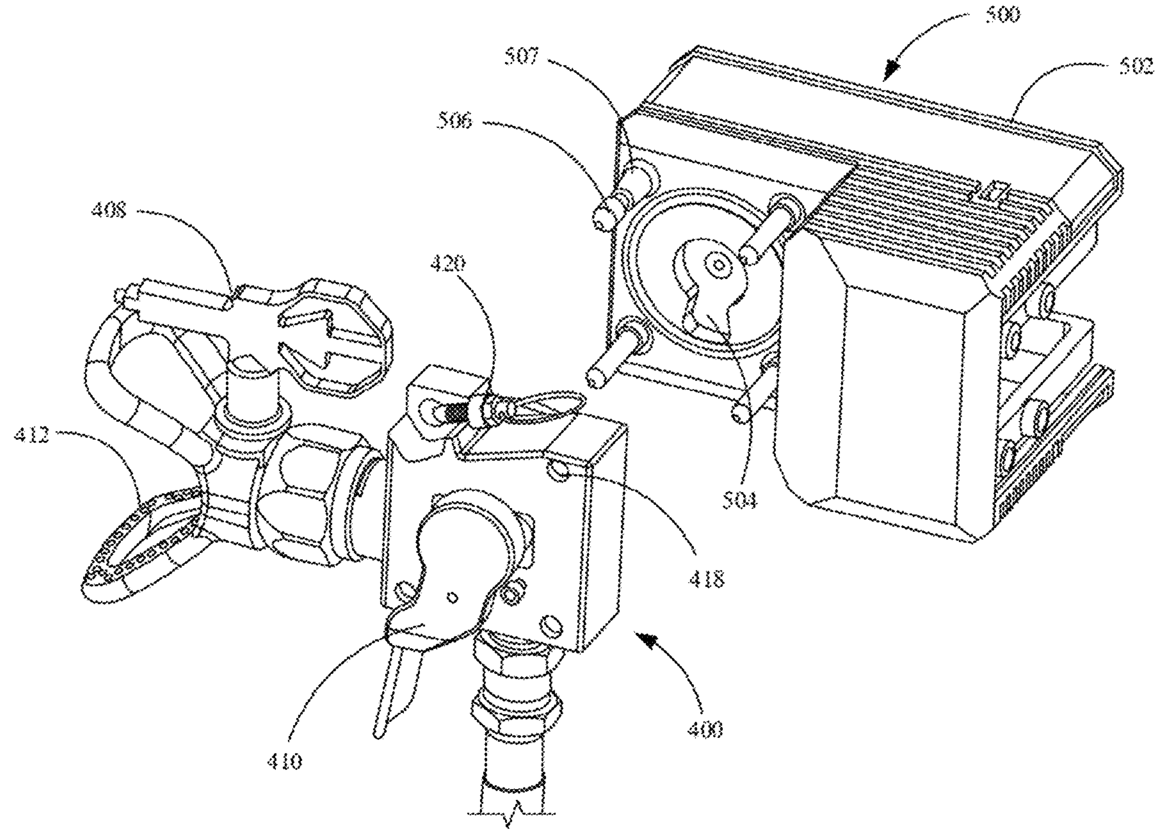

Spray head 400 also includes spray tip 408, which is configured to emit a fluid spray upon actuation of a first actuator, illustratively a hand-operated trigger 410. As shown in FIG. 4, trigger 410 is disposed near the bottom of spray head 400 and extends along the side of body 402. In this way, a user can manually actuate trigger 410 to open a valve assembly 411 (shown in FIG. 4-3) disposed within body 402 to cause fluid to flow from spray tip 408. Additionally, by having trigger 410 extend along the side of body 402, a user can manually actuate trigger 410 by applying force on the portion disposed on the side of body 402 while spray head 400 is coupled to the robotic control assembly. Spray head 400 also illustratively includes tip housing 412. Tip housing 412 is configured to secure spray tip 408 to body 402. Tip housing 412 is secured to body 402 by coupler 414, for example as discussed in further detail below.

Spray head 400 further includes a second actuator, illustratively an actuating mechanism 416 (shown in FIG. 4-2). Actuating mechanism 416 is operably coupled to trigger 410 and to valve assembly 411 disposed within body 402. Thus, either the first actuator or the second actuator can be actuated to open valve assembly 411 to spray fluid from spray head 400. Actuating mechanism 416 is configured to couple to a robotic control assembly in order to couple the robotic control assembly to the valve. Examples of actuating mechanism 416 are described in further detail below.

Examples of valve assembly 411 for spray head 108 are illustrated in U.S. patent application Ser. No. 15/704,745, which is hereby incorporated by reference in its entirety. For instance, the valve can be actuated by a cam assembly configured to receive a rotational force provided from trigger 410 and/or actuating mechanism 416 and transform the rotational force into liner motion to selectively drive the valve from a first position to a second position.

Spray head 400 includes apertures 418 on body 402 and a fastening mechanism 420 oriented transverse to the apertures 418. Apertures 418 and fastening mechanism 420 are discussed in further detail below.

FIG. 4-3, which is cross section view of spray head 400, illustrates that valve assembly 411 includes cam assembly 430 operably coupled to trigger 410 and actuating mechanism 416. In operation, when trigger 410 and/or actuation mechanism 416 is actuated, cam assembly 430 is configured to rotate to pull back valve 432. In one example, cam assembly 430, trigger 410, and actuating mechanism 416 are operably coupled to one another. For instance, cam assembly 430, trigger 410, and actuating mechanism 416 can be integrally formed as a single component. In another example, assembly 430, trigger 410, and actuating mechanism 416 can be separate components that are attached or coupled together such that actuation of trigger 410 and/or mechanism 416 causes corresponding rotation of cam assembly 430 about a rotation axis 431, which actuates valve 432 away from a valve seat 433, thus allowing fluid to exit the spray tip. In one example, spray head 400 includes a position sensor (such as a rotary potentiometer, not shown in FIG. 4) configured to generate a sensor signal indicative of a rotational position of assembly 430.

FIGS. 5-1, 5-2, 5-3, and 5-4 (collectively referred to as FIG. 5) provide views illustrating spray head 400, shown above in FIG. 4, coupled to a robotic control assembly 500, in one example. As shown, spray head 400 is coupled to robotic control assembly 500 while also being manually actuatable by a user. In this way, robot control assembly 500 can robotically control the valve within spray head 400, and a user can manually control the valve within spray head 400. Thus, spray head 400 has two modes of actuation. As described above, spray head 400 illustratively includes body 402 coupled to fluid line 404. Fluid line 404 is configured to allow fluid flow through body 402 and out of spray tip 408. Spray head 400 also includes tip housing 412 configured to couple spray tip 408 to body 402. Spray head further includes trigger 410, which extends upward along body 402 in order to allow for manual actuation of trigger 410 when coupled to robotic control assembly 500.

Robotic control assembly 500 includes a spray head coupler 501 configured to receive and removably couple body 402 of spray head 400 to assembly 500, in order to robotically control the valve of spray head 400. Illustratively, robotic control assembly 500 includes housing 502 having a motor (such as a servo motor) disposed therein configured to drive actuation of the valve within spray head 400. Robotic control assembly 500 includes triggering module 504, which includes a recess configured to receive, and retain therein, actuating mechanism 416 upon coupling robotic control assembly 500 to body 402. Illustratively, triggering module 504 includes a rotary actuator.

In one example, robotic control assembly 500 includes a position sensor (such as a rotary potentiometer, not shown in FIG. 5) configured to generate a sensor signal indicative of a rotational position of triggering module 504.

Coupler 501 includes a plurality of mounting pins 506 that are received in apertures 418 on body 402 in order to fix robotic control assembly 500 to body 402. One or more of mounting pins 506 are retained in apertures 418 by a fastening mechanism 420 oriented transverse to the apertures 418. In one example, fastening mechanism 420 can include a clip that engages a recess 507 in order to retain mounting pins 506 in apertures 418. In another example, an aperture can be formed in one or more of the mounting pins 506 such that fastening mechanism 420 can extend therethrough. By pulling on fastening mechanism 420 in a direction illustrated by arrow 508, robotic control assembly 500 can be easily decoupled and removed from body 402. In this way, robotic control assembly 500 can be fixed to and removed from body 402 without the need for any additional tools.

In operation, robotic control assembly 500 is couple to body 402 via pins 506 such that triggering module 504 retains actuating mechanism 416 therein. Upon powering robotic control assembly 500, the motor (not shown) drives rotation of triggering module 504, thereby causing actuating mechanism 416 to rotate in order to open the valve disposed within body 402 and allow fluid to be emitted from tip 408. Specifically, a control system is configured to control operation of the motor to change the rotational position of triggering module 504, which controls the extent to which the spray control valve is opened. In this way, spray head 400 can be actuated by robotic control assembly 500 in order to undergo a spraying operation without the need for manual actuation of trigger 410 by an operator. However, even while robotic control assembly 500 is coupled to spray head 400, a user can still manually actuate the valve by actuating trigger 410.

Conventional spraying control valves often require a high amount of torque to actuate. For instance, one example spray gun has a trigger configuration requiring two pounds of torque at three inches from the trigger's axis of rotation.

In one example, the configuration of spray head 400 requires relatively low torque to open the valve. For instance, the torque required to actuate the valve (e.g., by trigger 410 and/or actuating mechanism 416) can be less than or equal to five hundred inch-ounces. In another example, the torque required can be less than or equal to four hundred inch-ounces. In another example, the torque required can be less than or equal to three hundred inch-ounces. In another example, the torque required can be less than or equal to two hundred inch-ounces. In another example, the torque required can be less than or equal to one hundred inch-ounces.

Triggering module 504 is sized such that it can encompass actuating mechanism 416 while also allowing actuating mechanism 416 some degree of independent rotation within triggering module 504. For example, if robotic control assembly 500 is not in operation (e.g., module 504 is stationary), a user can manually actuate trigger 410 while robotic control assembly 500 is still coupled to body 402 in order to allow fluid to flow from tip 408. In this way, an operator can manually operate spray head 400 while robotic control assembly 500 remains fixed to body 402. For instance, an operator may wish to manually apply an additional coating of paint on a particular point on the target surface. In another example, the operator may want to ensure that tip 408 is not clogged. Additionally, an operator may want to check the conditions of the paint (e.g., color) prior to operating robotic control assembly 500, purge air out of fluid line 404, etc. In one example, triggering module 504 is sized such that actuating mechanism 416 can independently rotate about fifteen degrees. By actuating trigger 410, an operator can manually spray a given amount of paint without the removal of robotic control assembly 500. Of course, robotic control assembly 500 can also be easily decoupled from spray head 400 via fastening mechanism 420 for separate manual operation of spray head 400 as well.

Figures 1, 6:
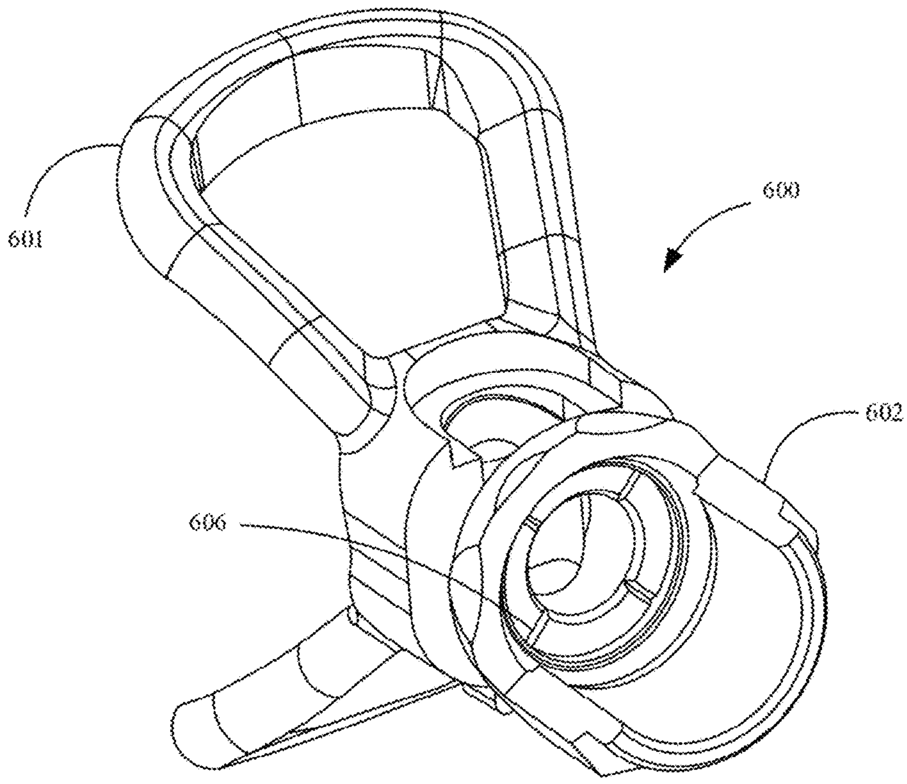
Figures 2, 6:
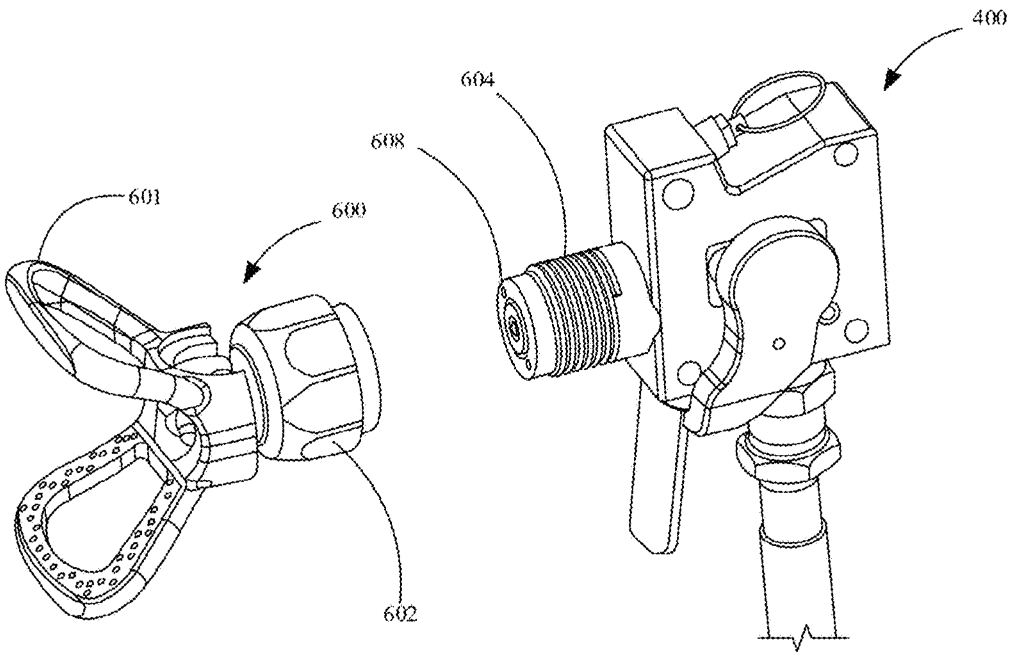

FIGS. 6-1 and 6-2 (collectively referred to as FIG. 6) illustrate an example tip housing assembly 600. Tip housing assembly 600 illustratively includes tip guard 601, and a coupler 602 configured to couple to a spray head, such as spray head 400. In the example shown in FIG. 6-2, coupler 602 is a threaded coupler that threadably couples to spray head 400 by threaded portion 604. However, it is expressly contemplated that a different coupler can be utilized as well, such as a clip-on fastener, etc.

As shown in FIG. 6-1, tip housing assembly 600 illustratively includes a plurality of slots 606 disposed in the interior portion of coupler 602. Slots 606 are configured to couple to a plurality of protrusions 608 disposed on the distal end of spray head 400. The protrusions can be, in one example, spring-loaded protrusions. However, it is expressly contemplated that other protrusions can be utilized as well. Upon coupling tip housing assembly 600 to spray head 400, slots 606 are configured to align with protrusions 608 such that tip housing assembly 600 remains aligned in the same position upon realignment. In this way, slots 606 and protrusions 608 function as a detent mechanism that define a plurality of discrete rotation increments. As shown, there are four slots 606 and two protrusions 608, allowing for alignment of tip housing assembly 600 into four possible positions at ninety-degree increments. However, in other examples, a different number of slots 606 and/or protrusions 608 can be utilized as well to allow for a different number of possible alignments of tip housing assembly 600.

Figures 1, 7:
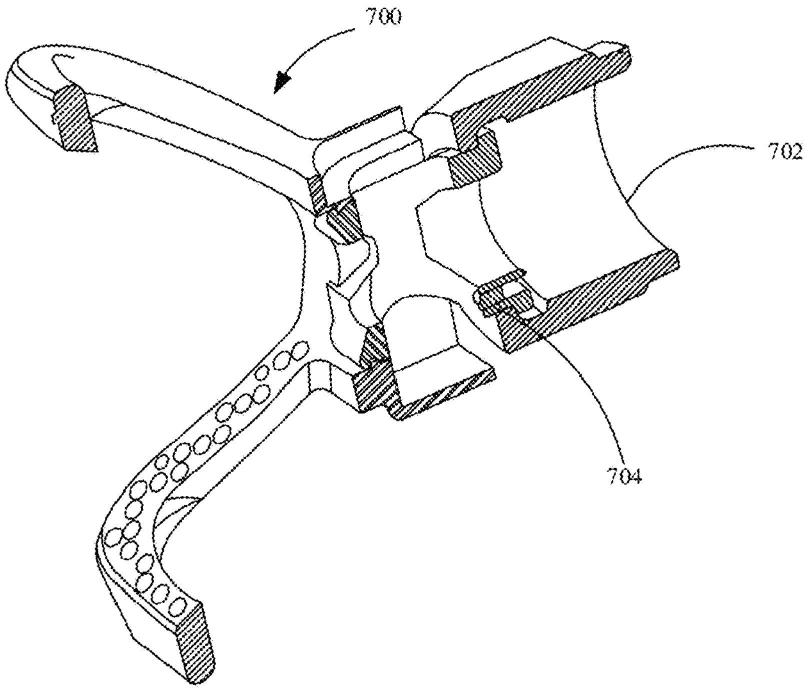
Figures 2, 7:
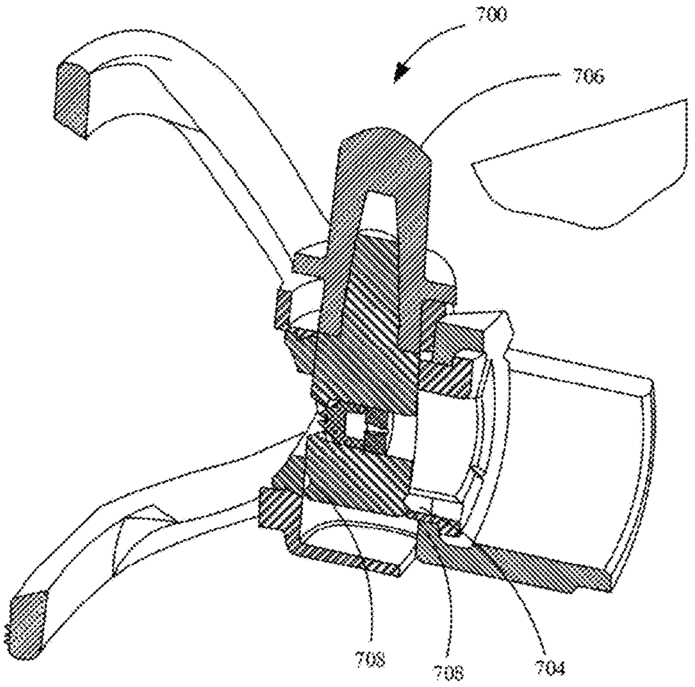

FIGS. 7-1 and 7-2 (collectively referred to as FIG. 7) are cross-sectional views showing one example tip housing being removably coupled to a spray tip. Tip housing 700 illustratively includes coupler 702 having one or more protrusions 704 disposed therein. As shown in FIG. 7, one protrusion is utilized. However, it is expressly contemplated that multiple protrusions can be utilized as well. Upon fixing spray tip 706 into tip housing 700 (shown in FIG. 7-2), protrusion 704 is configured to align with one or more corresponding grooves 708 disposed on tip 706. As shown in FIG. 7-2, two grooves are disposed on tip 706, allowing for alignment of tip 706 into tip housing 700 in two possible positions (forward and reverse). In this way, protrusion 704 and grooves 708 function as a detent to consistently align spray tip 706 to tip housing 700. Examples of tip 706 are described in more detail below.

Figures 1, 8:
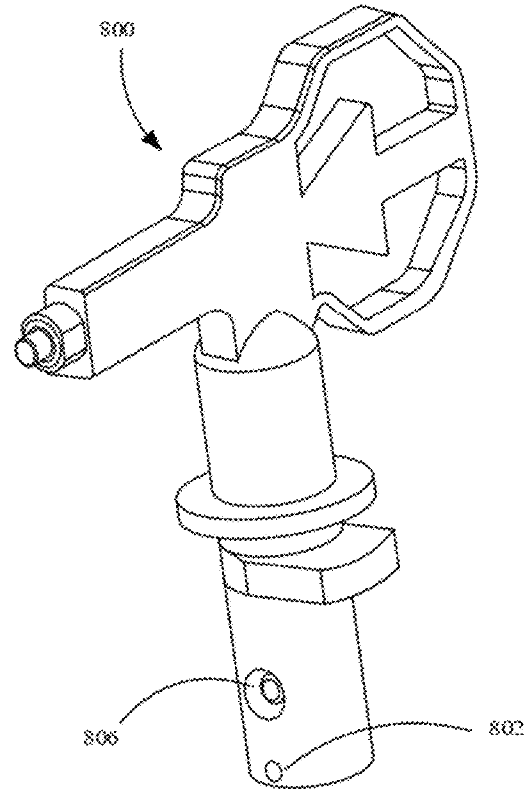
Figures 2, 8:
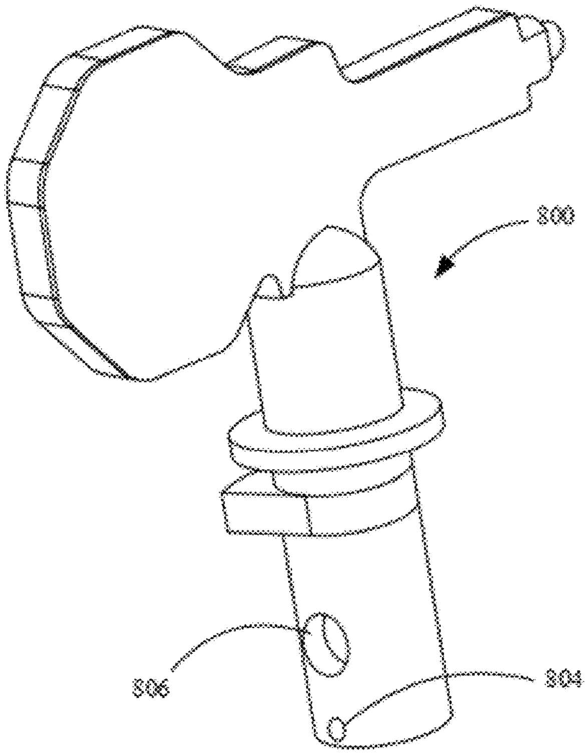

FIGS. 8-1 and 8-2 (collectively referred to as FIG. 8) illustrate an example spray tip 800. Spray tip 800 illustratively includes a first groove 802 and a second groove 804 (e.g., grooves 708 in FIG. 7-2). As described above, grooves 802 and 804 are configured to couple to a protrusion disposed within the tip housing in order to align spray tip 800 within the spray head. As shown, there are two grooves 802 and 804, and thus two possible alignment positions of spray tip 800. However, it is expressly contemplated that additional or fewer grooves can be implemented into spray tip 800 as well to allow for a different number of possible alignment positions. Spray tip 800 also includes a flow aperture 806. Upon aligning grooves 802 or 804 with a protrusion (not shown), spray tip 800 is fixed into a position that allows a valve disposed within the spray head to couple to aperture 806, thereby allowing fluid flow from spray tip 800 upon actuation of the trigger and/or actuating mechanism.

Figures 1, 9:
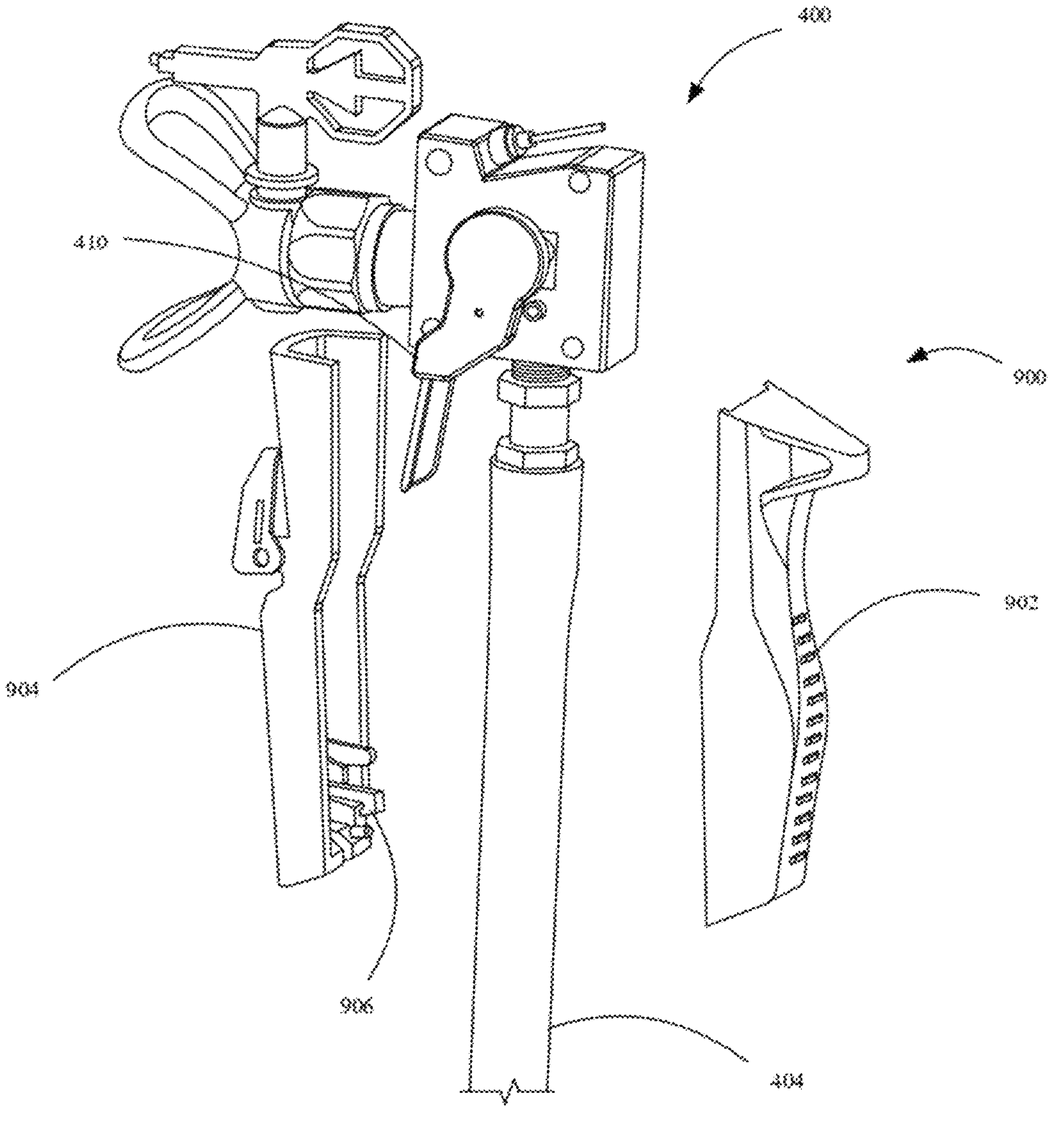
Figures 2, 9:
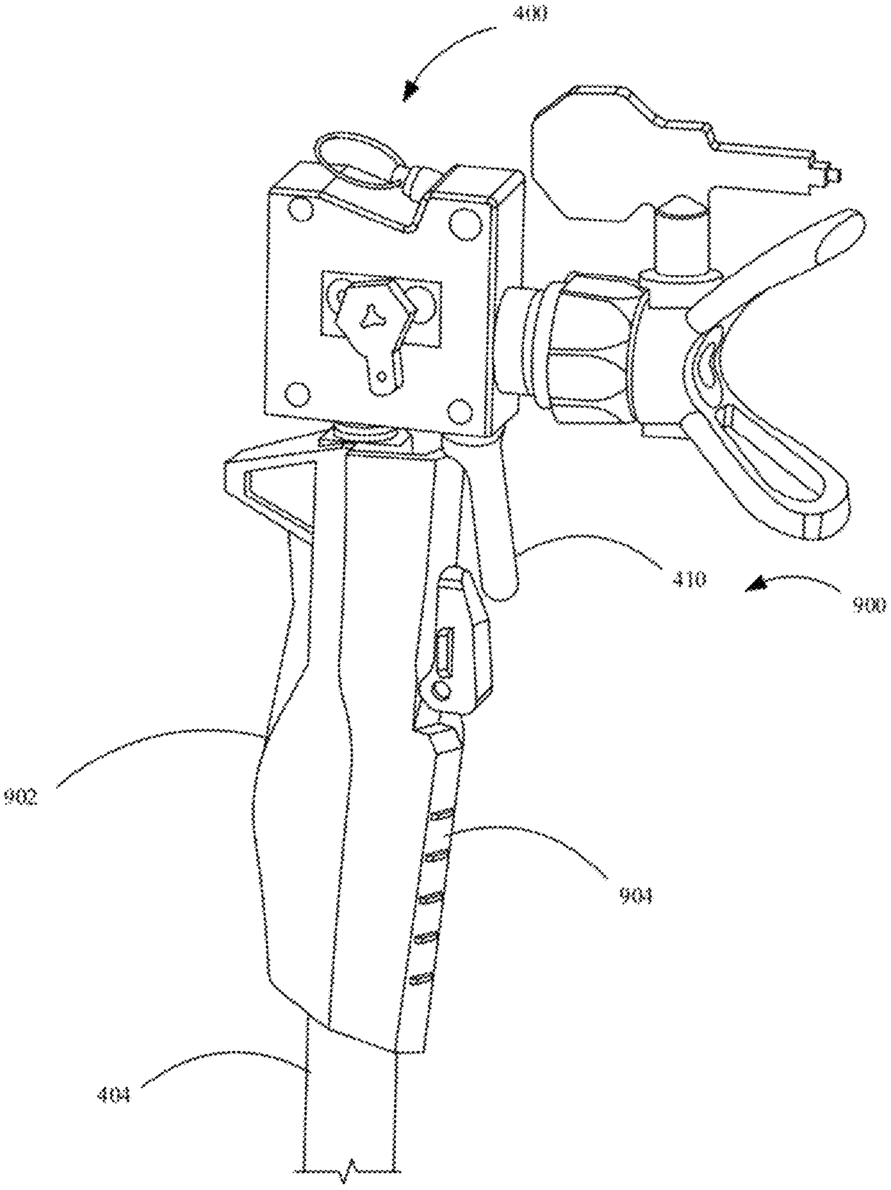

FIGS. 9-1 and 9-2 (collectively referred to as FIG. 9) illustrate an example removable spray handle 900 for a spray head, such as spray head 400. Spray handle 900 includes a first handle segment 902 and a second handle segment 904 that can be coupled together to form an ergonomic handle. As shown, handle segment 904 includes clip mechanism 906 that can fit to a receiving portion (not shown) on handle segment 902 in order to secure the handle segments together around fluid line 404. By securing handle segment 902 to handle segment 904, an ergonomic handle forms that allows spray head 400 to be manually operated and controlled by an operator when spray head 400 is detached from the robotic control assembly. Handle segments 902 and 904 can be attached when, for example, an operator wants to test whether the spray tip is clogged. In another example, an operator may want to manually test spray head 400 upon changing color of the paint to be sprayed. By fixing handle segments 902 and 904 together to form an ergonomic handle, an operator can manually actuate trigger 410 in order to operate or otherwise control spray head 400.

It should also be noted that the different examples described herein can be combined in different ways. That is, parts of one or more examples can be combined with parts of one or more other examples. All of this is contemplated herein.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

As used herein, if a description includes "one or more of" or "at least one of" followed by a list of example features with a conjunction "or" between the penultimate example feature and the last example feature, then this is to be read such that (1) one example includes at least one of or one or more of each feature of the listed features, (2) another example includes at least one of or one or more of only one feature of the listed features, and (3) another example includes some combination of the listed features that is less than all of the features and more than one of the features.

As used herein, if a description includes "one or more of" or "at least one of" followed by a list of example features with a conjunction "and" between the penultimate example feature and the last example feature, then this is to be read such that the example includes at least one of or one or more of each feature of all the listed features.

As used herein, if a description includes "one or more of" or "at least one of" followed by a list of example features with a conjunction "and/or" between the penultimate example feature and the least example feature, then this is to be read such that, in one example, the description includes "one or more of" or "at least one of" followed by a list of example features with a conjunction "or" between the penultimate example feature and the last example feature, and, in another example, the description includes "one or more of" or "at least one of" followed by a list of example features with a conjunction "and" between the penultimate example feature and the last example feature.

The present discussion has mentioned processors and/or servers. In one embodiment, the processors and/or servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
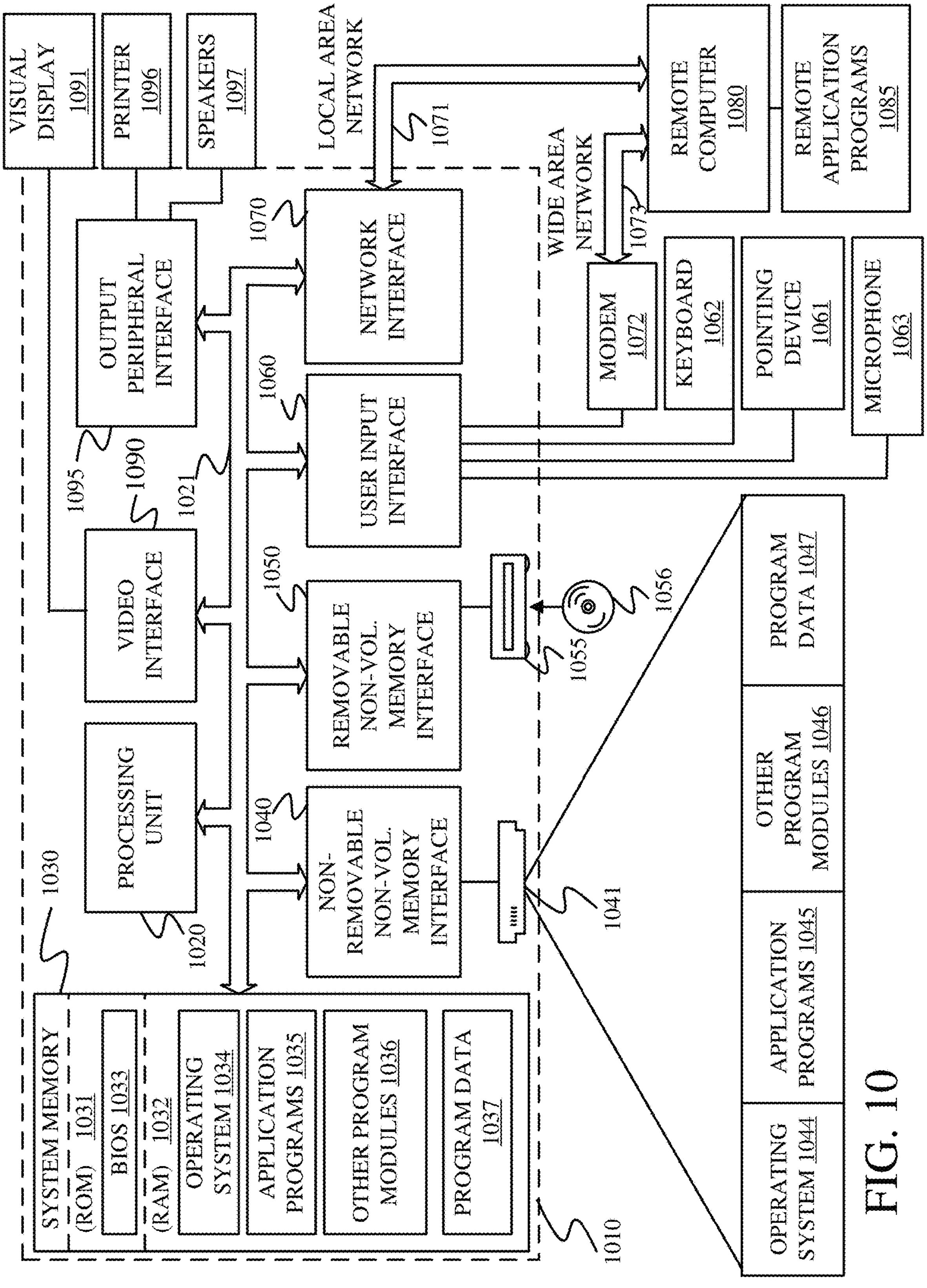
FIG. 10 is a block diagram showing one example of a computing environment that can be used in the architectures shown in the previous Figures.

FIG. 10 is one example of a computing environment in which elements of FIG. 1, or parts of it, (for example) can be deployed. With reference to FIG. 10, an example system for implementing some embodiments includes a computing device in the form of a computer 1010. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 1 can be deployed in corresponding portions of FIG. 10.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random-access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable volatile/nonvolatile computer storage media. By way of example only, FIG. 10 illustrates a hard disk drive 1041 that reads from or writes to non-removable, nonvolatile magnetic media, an optical disk drive 1055, and nonvolatile optical disk 1056. The hard disk drive 1041 is typically connected to the system bus 1021 through a non-removable memory interface such as interface 1040, and optical disk drive 1055 is typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network—WAN or a controller area network—CAN) to one or more remote computers, such as a remote computer 1080.

When used in a LAN networking environment, the computer 1010 is connected to the LAN 871 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 10 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts mentioned above are disclosed as example forms of implementing the claims.

What is claimed is:

1. A spraying system comprising:

a spray head including:

a spray tip;

a valve actuatable between a closed position that restricts fluid flow to the spray tip and an open position that allows fluid flow to the spray tip;

a first valve actuating mechanism operably coupled to the valve and manually actuatable by a user to actuate the valve to the open position; and a second valve actuating mechanism operably coupled to the valve; and a robotic assembly configured to removably receive the spray head, the robotic assembly comprising:

a robotically actuatable control module configured to engage and actuate the second valve actuating mechanism to actuate the valve to the open position; and a controller configured to:

receive a control input, and actuate the robotically actuatable control module, based on the control input, to move the valve at an opening speed and/or closing speed that is based on an adjustable speed parameter.

2. The spraying system of claim 1, wherein the first valve actuating mechanism and the second valve actuating mechanism are operably coupled to one another such that movement of the first valve actuating mechanism causes a corresponding movement of the second valve actuating mechanism.

3. The spraying system of claim 1, wherein
the spray head comprises a spray head body, and
the first valve actuating mechanism comprises a trigger rotatably supported on and extending from the spray head body.

4. The spraying system of claim 1, wherein the robotically actuatable control module comprises a rotary actuator having a recess configured to receive the second valve actuating mechanism.

5. The spraying system of claim 4, wherein the rotary actuator comprises a servo motor, and further comprising a rotary potentiometer configured to generate a sensor signal indicative of a rotational position of the rotary actuator, and wherein the robotic assembly is configured to control the robotically actuatable control module based on the sensor signal.

6. The spraying system of claim 4, wherein the second valve actuating mechanism has a range of rotation, about a rotational axis of the second valve actuating mechanism, that corresponds to actuation of the valve between the closed position and the open position.

7. The spraying system of claim 6, wherein, while the rotary actuator remains stationary, the recess of the rotary actuator is configured to allow rotation of the second valve actuating mechanism within the recess, thereby allowing movement of the valve from the closed position to the open position.

8. The spraying system of claim 6, wherein the range of rotation comprises a first range of rotation, and wherein the rotation of the second valve actuating mechanism allowed by the recess comprises a second range of rotation that is substantially similar to an angular distance of the second range of rotation.

9. The spraying system of claim 8, wherein each of the first range of rotation and the second range of rotation is between ten and twenty degrees.

10. The spraying system of claim 1, wherein the robotic assembly comprises a plurality of alignment protrusions and the spray head includes a plurality of apertures configured to receive the plurality of alignment protrusions.

11. The spraying system of claim 10, wherein at least one alignment protrusion, of the plurality of alignment protrusions, is configured to receive a locking mechanism that retains the at least one alignment protrusion within a respective aperture of the plurality of apertures.

12. The spraying system of claim 1, wherein the controller is configured to adjust the adjustable speed parameter, to change the opening speed and/or closing speed, based on a configuration input.

13. The spraying system of claim 12, wherein the configuration input indicates one or more of:
a tip size of the spray tip;
a detected tip wear of the spray tip; or
a type of fluid being sprayed.

14. A robotic spray head control assembly comprising:
a spray head coupler configured to removably couple a spray head to the robotic spray head control assembly;
a rotary actuator having a recess configured to receive a valve actuating mechanism of the spray head; and
a controller is configured to:
receive a control input, and
rotate the rotary actuator, based on the control input, to actuate the valve actuating mechanism with at least one of an opening speed or a closing speed that is based on an adjustable speed parameter,
wherein the controller is configured to adjust the adjustable speed parameter, to change the at least one of the opening speed or the closing speed, based on a configuration input that indicates one or more of:
a tip size of a spray tip of the spray head;
a detected tip wear of the spray tip; or
a type of fluid being sprayed.

15. A spraying system comprising:
a spray head including:
a spray tip;
a valve actuatable between a closed position that restricts fluid flow to the spray tip and an open position that allows fluid flow to the spray tip;
a first valve actuating mechanism operably coupled to the valve and manually actuatable by a user to actuate the valve to the open position; and
a second valve actuating mechanism operably coupled to the valve; and
a robotic assembly configured to removably receive the spray head, the robotic assembly comprising a robotically actuatable control module configured to engage and actuate the second valve actuating mechanism to actuate the valve to the open position,
wherein the robotic assembly comprises a plurality of alignment protrusions and the spray head includes a plurality of apertures configured to receive the plurality of alignment protrusions.

16. The spraying system of claim 15, wherein at least one alignment protrusion, of the plurality of alignment protrusions, is configured to receive a locking mechanism that retains the at least one alignment protrusion within a respective aperture of the plurality of apertures.

17. A spraying system comprising:
a spray head including:
a spray tip;
a valve actuatable between a closed position that restricts fluid flow to the spray tip and an open position that allows fluid flow to the spray tip;
a first valve actuating mechanism operably coupled to the valve and manually actuatable by a user to actuate the valve to the open position; and
a second valve actuating mechanism operably coupled to the valve, wherein the second valve actuating mechanism has a range of rotation, about a rotational axis of the second valve actuating mechanism, that corresponds to actuation of the valve between the closed position and the open position;
a robotic assembly configured to removably receive the spray head, the robotic assembly comprising a robotically actuatable control module configured to engage and actuate the second valve actuating mechanism to actuate the valve to the open position, wherein the robotically actuatable control module comprises:
a rotary actuator having a recess configured to receive the second valve actuating mechanism, the rotary actuator comprising a servo motor, wherein while the rotary actuator remains stationary, the recess of the rotary actuator is configured to allow rotation of the second valve actuating mechanism within the recess, thereby allowing movement of the valve from the closed position to the open position; and
a rotary potentiometer configured to generate a sensor signal indicative of a rotational position of the rotary actuator, wherein the robotic assembly is configured to control the robotically actuatable control module based on the sensor signal.

18. The spraying system of claim 17, wherein the range of rotation comprises a first range of rotation, and wherein the rotation of the second valve actuating mechanism allowed by the recess comprises a second range of rotation that is substantially similar to an angular distance of the second range of rotation.

19. The spraying system of claim 18, wherein each of the first range of rotation and the second range of rotation is between ten and twenty degrees.

* * * * *